US011574257B2

(12) United States Patent
Sivanandam et al.

(10) Patent No.: US 11,574,257 B2
(45) Date of Patent: Feb. 7, 2023

(54) DATABASE SYSTEMS FOR NON-SIMILAR ACCOMMODATION DETERMINATION

(71) Applicant: Airbnb, Inc., San Francisco, CA (US)

(72) Inventors: Navin Sivanandam, Oakland, CA (US); Christian Aurelio Goldammer, San Francisco, CA (US); Michael Andrew Hinckley, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 329 days.

(21) Appl. No.: 16/812,077

(22) Filed: Mar. 6, 2020

(65) Prior Publication Data
US 2021/0279647 A1    Sep. 9, 2021

(51) Int. Cl.
*G06Q 10/02*    (2012.01)
*G06N 20/00*    (2019.01)
*G06F 16/908*   (2019.01)
*G06Q 50/12*    (2012.01)

(52) U.S. Cl.
CPC .......... *G06Q 10/02* (2013.01); *G06F 16/908* (2019.01); *G06N 20/00* (2019.01); *G06Q 50/12* (2013.01)

(58) Field of Classification Search
None
See application file for complete search history.

(56) References Cited

U.S. PATENT DOCUMENTS

| 8,290,696 | B1 * | 10/2012 | Sridhar | ................. G08G 5/045 |
| | | | | 701/1 |
| 2005/0137925 | A1 | 6/2005 | Lakritz et al. | |
| 2012/0053968 | A1 * | 3/2012 | Debarge | ................. G06Q 10/02 |
| | | | | 705/5 |
| 2013/0124237 | A1 * | 5/2013 | Oztekin | ............. G06F 16/9537 |
| | | | | 707/723 |
| 2014/0257900 | A1 | 9/2014 | Jacobs et al. | |
| 2014/0278591 | A1 | 9/2014 | Blecharczyk et al. | |
| 2016/0125327 | A1 | 5/2016 | Lamoureux et al. | |

(Continued)

OTHER PUBLICATIONS

Zamani, E., Trust in the Sharing Economy: the AirBnB case, 2019, White Rose University, (Year: 2019).*

(Continued)

*Primary Examiner* — Resha Desai
*Assistant Examiner* — Ismail A Manejwala
(74) *Attorney, Agent, or Firm* — Schwegman Lundberg & Woessner, P.A.

(57) ABSTRACT

A system and a method are disclosed for replacing an accommodation of a canceled booking for a guest user. In an embodiment, an accommodation management system receives, from a homestay application, an indication that a booking for the accommodation in a region by the guest user over a time period has been canceled. The system retrieves a homestay listing associated with the booking and retrieves attributes of the homestay listing. The system maps each attribute to a set of similar attributes in an equivalence table. The system retrieves a set of available hotel listings in the region for the same time period and determines attributes of each available hotel listing. The system determines a set of comparable hotel listings that each include similar attributes to the homestay listing and sends a command to book a comparable hotel listing the guest user during the time period.

18 Claims, 15 Drawing Sheets

(56) References Cited

U.S. PATENT DOCUMENTS

2016/0189060 A1* 6/2016 Ngo ................ G06Q 10/02
                                                    705/5
2019/0340537 A1* 11/2019 Fung .............. G06Q 30/0282

OTHER PUBLICATIONS

United States Office Action, U.S. Appl. No. 16/812,083, dated May 10, 2022, 13 pages.
United States Office Action, U.S. Appl. No. 16/812,074, dated Jun. 29, 2022, 28 pages.

* cited by examiner

300A

| Décor 305A |||| 
|---|---|---|---|
| Art Deco 310A || Coastal 310B ||
| Curved wall | Bold pattern | Light Color Palette | Sea shells |
| Curved furniture 315 | Pop of color | Natural element | Surfboard 325 |
| Geometric window 320 | Gold feature | Chevron | Natural Light |
| Setting 305B ||||
| Circular Quay 310C | Coogee 310D | Surry Hills 310E ||
| Opera House 330 | Cafes | Urban ||
| Public transit | Quiet | Culture ||
| Pubs | Beach | Cafes ||
| Urban | Suburban | Boutiques ||
| Museums | Public transit | Trendy ||
| Features 305C ||||
| Swimming 310F ||||
| Near Rock Pool | Beach Access | Private Pool ||
| Luxury 310G ||||
| Wine Cellar | Koi Pond | Rooftop Garden ||

*FIG. 3A*

| Space 305E | |
|---|---|
| Homestay Listing 355 | Commercial Listing 360 |
| Size 310J | |
| Studio apartment 365 → 375 | Hotel room with kitchenette 370 |
| One bedroom (w/o private bath) | Hostel room |
| 2-bedroom home | Hotel suite |
| 3-bedroom home | 2 hotel suites |
| Luxury 5-bedroom home | Penthouse suite |
| Beds 310K | |
| 1 queen bed and 1 sofa bed 380 →390 | 2 queen beds 382 |
| | 1 king bed and 1 sofa bed 384 |
| | 1 queen bed and 1 rollaway bed 386 |
| 1 king bed and 2 twin beds | 3 queen beds |
| | 1 king bed and 2 queen beds |

My Trips

Sydney, NSW

---

Entire House • 3 Beds • Ocean View • Free Wifi • Convenient 3 beds • 1 bedroom • 1 bath • Beach Access • Plunge Pool • Kitchen • Air Conditioning • Washer/Dryer • TV

---

Check in  →  Check out
Jan 8, 2021     Jan 12, 2021

Marissa L.

Guests: 2 adults $175 / night
Total: $700

4.8 (253)

| Contact Host | Cancel Booking |
| :---: | :---: |
| 505 | 510 |

DATABASE SYSTEMS FOR NON-SIMILAR ACCOMMODATION DETERMINATION

CROSS REFERENCE TO RELATED APPLICATIONS

This application is related to U.S. application Ser. No. 16/812,074, titled "DATABASE SYSTEMS FOR SIMILAR ACCOMMODATION DETERMINATION," and U.S. application Ser. No. 16/812,083, titled "DATABASE SYSTEMS FOR RESERVATION OF INVENTORY TO SUBSTITUTE FOR HOST CANCELATION," both of which are filed on an even date herewith and incorporated herein by reference in their entireties.

TECHNICAL FIELD

The disclosure generally relates to the field of database systems, and, more particularly, to structuring data entries to efficiently draw equivalences between homestay and hotel accommodations.

BACKGROUND ART

Homestay accommodations are unique because, unlike hotels, the homestay accommodations are custom-built and/or custom-furnished. Further, each homestay accommodations may include a unique set of features, amenities, and other attributes. In contrast, hotel accommodations may include a similar features, amenities, and attributes to other hotel accommodations. When a booking for a hotel accommodation is canceled, another hotel accommodation may usually replace the canceled booking with similar attributes. However, when bookings for homestay accommodations are canceled, existing accommodation management systems are incapable of identifying equivalent hotel accommodations for booking due to the unique nature of each homestay accommodation. Using a database search, existing accommodation management systems may not be able to determine the attributes of hotel accommodations and identify a true match of all attributes of the homestay accommodation to a hotel accommodation. Accordingly, existing accommodation management systems leave guests who face cancelations of their bookings without adequate hotel alternatives for lodging, particularly in the case of a last-minute cancelation that may leave a guest without time to find a replacement accommodation.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 3A-3C illustrates an example of portions of an equivalence table, according to one embodiment.

FIG. 7 illustrates an example user interface showing an automatic rebooking, according to one embodiment.

DETAILED DESCRIPTION

Figure 1:
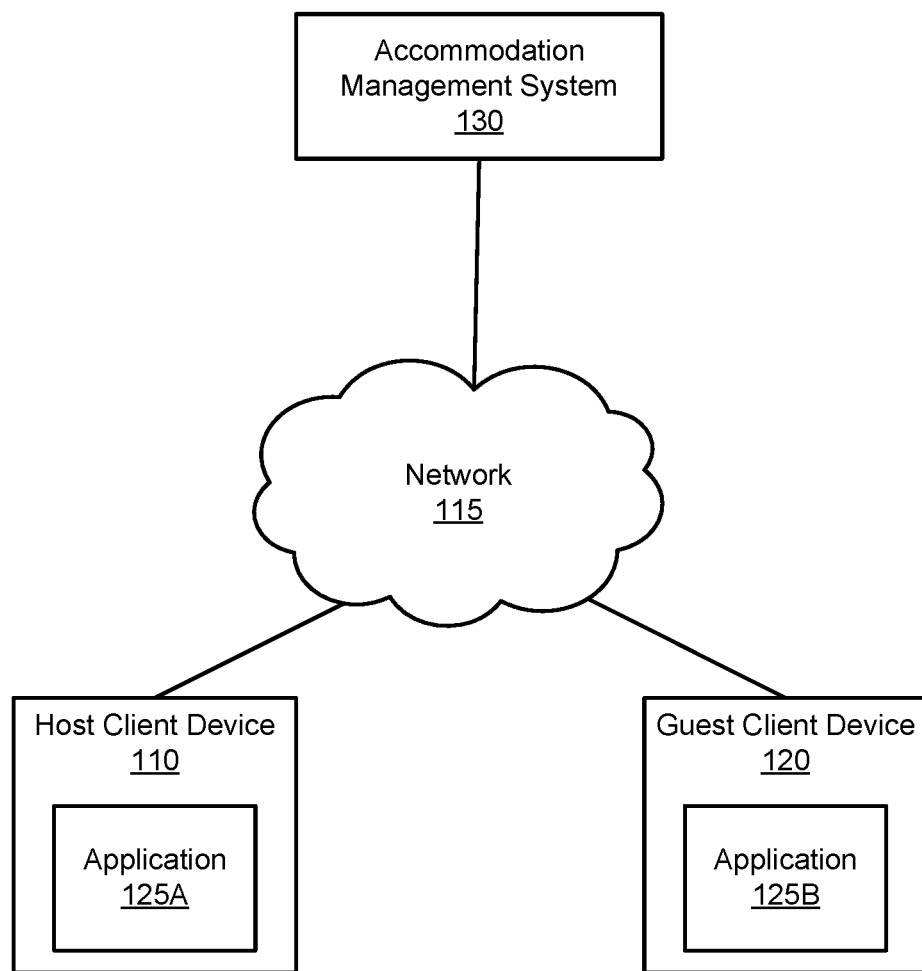
FIG. 1 illustrates one embodiment of an environment for an accommodation management system.

The FIGS. and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

CONFIGURATION OVERVIEW

One embodiment of a disclosed system, method and computer readable storage medium that includes enabling an accommodation management system to replace homestay accommodations that has been canceled. When a host user cancels a booking for a homestay accommodation (or a booking is otherwise unexpectedly canceled), an accommodation management system determines attributes of the homestay accommodation. The accommodation management system accesses database of attributes for each unique listing and creates mappings between like attributes. The accommodation management system accesses available hotel listings, either listed through the accommodation management system or a separate accommodation management system, and determines attributes of the available hotel listings to identify equivalent hotel listings to the homestay listing. Thus, the accommodation management system may automatically rebook or recommend one or more hotel listings for rebooking to a guest user from the equivalent hotel listings.

In one embodiment, an accommodation management system receives an indication that a booking by a guest user for an accommodation over a time period was canceled. The accommodation management system retrieves, from a listing database, a homestay listing associated with the accommodation and a region of the accommodation and retrieves, from an attribute database, attributes of the canceled listing. The accommodation management system maps each attribute of the homestay listing to a set of similar attributes in an equivalence table. The accommodation management system retrieves a set of available hotel listings in the region during the time period and determines attributes of each retrieved available hotel listing. The accommodation management system determines a set of comparable hotel listings from the available hotel listings. Each comparable hotel listing includes a threshold number of similar attributes to the homestay listing. The accommodation management system sends a command to book one of the set of comparable hotel listings for the guest user during the time period by populating a booking data structure with a connection between the comparable hotel listing and the guest user.

Accommodation Management System Environment

FIG. 1 illustrates one embodiment of a network environment 100 for components of an accommodation management system 130. The environment 100 includes a host client device 110, network 115, guest client device 120, and accommodation management system 130. Though only one of each type (i.e., host or guest) of client device is shown in FIG. 1, other embodiments may use more than one client device of either type. These various components are now described in additional detail.

Host client device 110 is a client device of a host user of accommodation management system 130. The term host user, as used herein, refers to a user of accommodation management system 130 that lists accommodations on accommodation management system 130. The term guest user, as used herein, refers to a user of accommodation management system 130 that books a listed accommodation. The term client device 110, whether used with reference to a host user or a guest user, refers to a computing device such as a smart phone, laptop, computer, or any other device that can access the accommodation management system 130.

Host client device 110 includes application 125A, and guest client device 120 includes application 125B. The term application, when used in connection with accommodation management system 130, whether used in reference to a host user, a guest user, or a third-party user, refers to an application capable of carrying out actions relating to use of accommodation management system 130 that are described herein. Examples of such actions include outputting listings for display, completing a booking of a listed accommodation, outputting notifications and/or indications to a host or a guest, completing a check-in or check-out process, commanding an entry to an accommodation to unlock, and the like. In some embodiments, each of the client devices includes one or more instances of an application 125 associated with the accommodation management system 130. Any number of client devices may be included in environment 100; the depiction of only one of each of host client device 110 and guest client device 120 is merely for convenience.

Network 115 may be any suitable communications network for data transmission. In an embodiment such as that illustrated in FIG. 1, network 115 uses standard communications technologies and/or protocols and can include the Internet. In another embodiment, the entities use custom and/or dedicated data communications technologies. Network 115 connects host client device 110, guest client device 120 (or client devices, in other embodiments), and any other client device to accommodation management system 130 such that the host client device 110, guest client device, and accommodation management system 130 can transmit data back and forth.

Accommodation management system 130 facilitates activity relating to listing, booking, and physically accessing an accommodation. Further details relating to such activities are described throughout with reference to FIGS. 2-12 below.

Accommodation Management System Configuration

Figure 2:
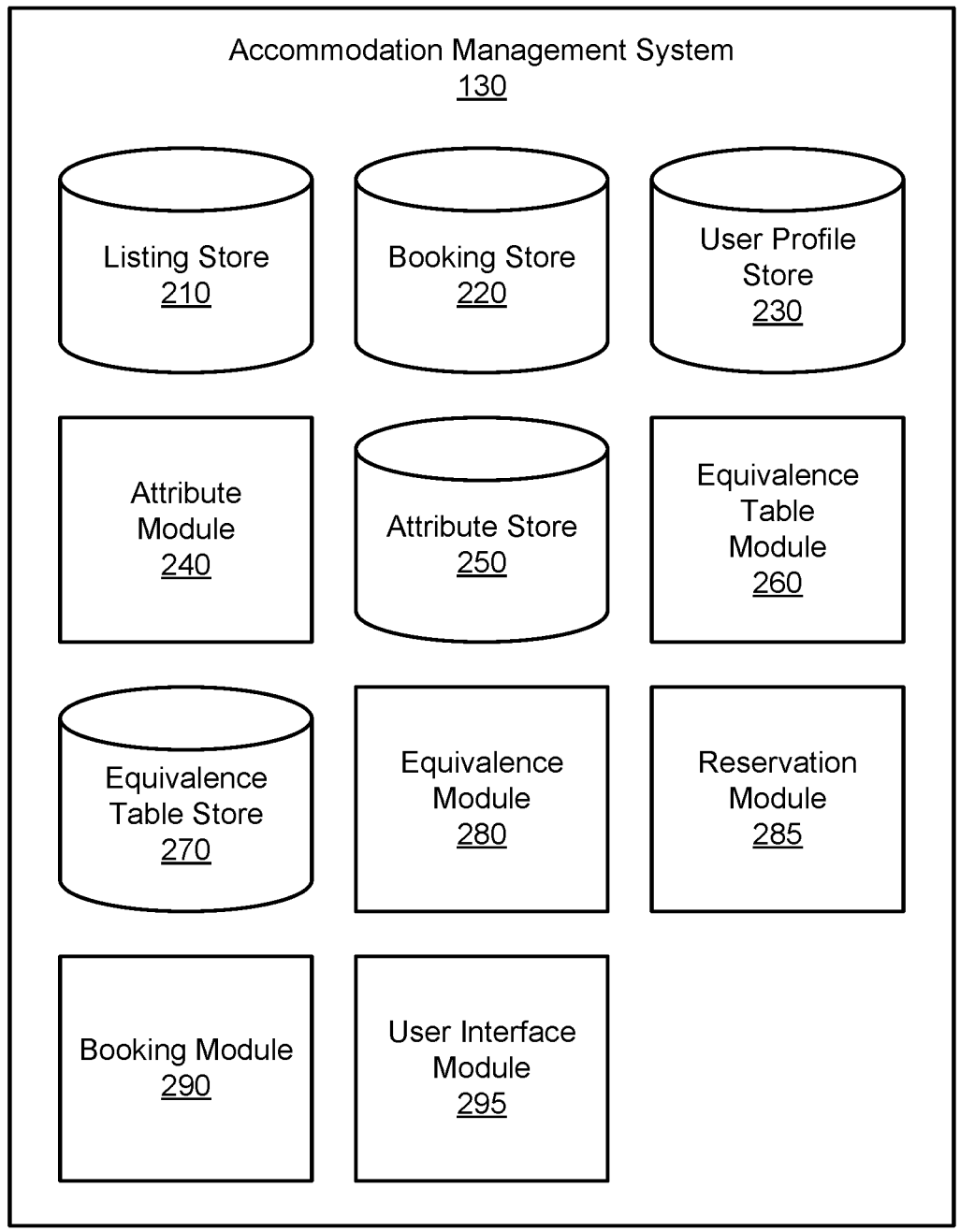
FIG. 2 illustrates one embodiment of an accommodation management system.

FIG. 2 illustrates one embodiment of accommodation management system 130. Accommodation management system 130 controls listing, booking, and reservation of accommodations listed by host users through the accommodation management system 130. The term accommodation, as used herein, refers to a space for lodging that may be booked by a guest user. Accommodation management system 130 includes listing store 210, booking store 220, user profile store 230, attribute module 240, attribute store 250, equivalence table module 260, equivalence table store 280, equivalence module 280, reservation module 285, booking module 290, and user interface module 295. The data stores and modules depicted with reference to FIG. 2 are merely exemplary; fewer or more databases and modules may be used to achieve the subject matter described herein.

Accommodation management system 130 stores information describing listings in listing store 210. The accommodation management system 130 receives information from a host user relating to an accommodation for rent and stores the information as a listing in listing store 220. The term listing, as used herein, refers to a description of an accommodation for rent that may be advertised to guest users of accommodation management system 130. Information about each listing may include information describing the accommodation, such as a geographic location and/or region of the accommodation, short description of the accommodation, list of house rules, list of amenities, pictures of the accommodation, spatial layout or description, price of the accommodation over a time period (i.e., per night, per stay, etc.), and guest user reviews of the accommodation. In some embodiments, listing store 210 is a data structure that stores connections between listings, host users, and other information about listings.

Information describing each listing may also include a type of listing, such as a homestay listing or a hotel listing. A homestay listing includes information describing a homestay accommodation, which is form of lodging at a host user's home or property. Some examples of homestay accommodations include an entire apartment, a private room within a home, and an upper floor of a home. Other homestay accommodations may include less conventional lodgings, such as a castle, house boat, tree house, or igloo. A hotel listing includes information describing a hotel accommodation, which is a form of lodging at a commercial establishment including multiple rooms for guest users to stay in. Some examples of hotel accommodations include hotel rooms and hostel rooms. Though in some embodiments hotel listings may describe hotel rooms, the term "hotel" is used herein to describe a commercial establishment for renting out a multitude of similar rooms to guest users at a company-managed property. In some embodiments, a separate accommodation management system lists hotel accommodations for rent, while accommodation management system 130 only lists homestay accommodations. In other embodiments, accommodation management system 120 lists hotel accommodations along with homestay accommodations.

Accommodation management system 130 also stores information describing the availability of each listing in listing store 210. Listing store 210 includes two sub-data stores: an available sub-data store and a reserved sub-data store. Accommodation management system 130 stores listings with dates they are available in the available sub-data store and stores listings with dates they are booked or reserved for in the reserved sub-data store. Accommodation management system 130 receives availability parameters from a host user of a listing and stores these availability parameters in listing store 210. As accommodation management system 130 receives information indicating that a listing has been booked by a guest user for certain dates, accommodation management system 130 updates the availability of the listing to indicate that the listing is unavailable on those dates and moves the listing from the available sub-data store to the reserved sub-data store for those dates. Further, accommodation management system 130 may reserve listings via reservation module 285, described in further detail below, to use for guest users in the case of booking cancelations. The information describing each listing in the reserved sub-data store of listing store 210 may include an indication of whether an unavailable listing was reserved or booked. In some embodiments, accommodation management system 130 stores availability by day for each listing in listing store 210. For example, if a guest user has booked an accommodation of a listing from Monday to Wednesday, information describing the listing in listing store 130 may indicate that the listing is unavailable on Monday and Tuesday, but is available again starting Wednesday.

Accommodation management system 130 stores information describing bookings in booking store 220. The term booking, as used herein, refers to a reservation for the accommodation of a listing by a guest user for a specific upcoming time period. The information describing bookings includes the listing, the guest user who booked the accommodation, and a time period the accommodation is booked for. In some embodiments, a booking may further include information from the listing or other information about the booking, such as other guest users associated with the same booking or check-in information from the host user. In some embodiments, accommodation management system 130 stores bookings in listing store 210 in association with listings. In these embodiments, each listing may be associated with multiple bookings by different guest users. In further embodiments, booking store 220 is a data structure that stores connections between listings, guest users, time periods, and other information about bookings.

Accommodation management system 130 may also store information describing historical user bookings in booking store 220. Historical user bookings include bookings made for past time periods by guest users of accommodation management system 130. Information describing a historical booking includes the listing, a guest user who booked the accommodation, the past time period, whether the booking was canceled, and any reviews from the guest user about the booking.

Accommodation management system 130 stores information describing user profiles in user profile store 230. A user profile describes a user and may include the user's name and contact information. Accommodation management system 130 stores an indication of whether each user of the accommodation management system 130 is a host user, a guest user, or both in user profile store 230. For host users, accommodation management system 130 stores information describing listings associated with the host user in user profile store 230, which include accommodations that the host user lists for rent on accommodation management system 130. For guest users, accommodation management system 130 stores historical booking information, which describes listings previously booked by the guest user, for each guest user in user profile store 230. In embodiments where a user is both a host user and a guest user, accommodation management system 130 may store information describing both listings and bookings associated with the user in booking store 230.

In some embodiments, historical booking information also describes accommodations the guest user stayed at but were booked by another guest user. For example, Josh, a guest user, may book an accommodation in Park City for the third week of December via the accommodation management system 130 and invite, via the accommodation management system 130, Winston, another guest user, to join a trip to stay at a lodge in Park City associated with the accommodation. By accepting the invitation, Winston may be able to receive information associated with the booking from accommodation management system 130, and the accommodation management system 130 stores the accommodation (i.e., the lodge in Park City) and time period (i.e. the third week of December) as historical booking information for both Josh and Winston in user profile store 230.

Accommodation management system 130 also stores user preference information for each guest user in user profile store 230. User preference information includes attributes that a guest user prefers in a listing. The term attribute, as used herein, refers to a characteristic of a listing, and attributes are further described in relation to the attribute module 240. For example, user preference information may indicate that a guest user prefers their accommodations to be near public transit and include a hot tub. In some embodiments, the guest user ranks, via a user interface of accommodation management system 130, their prioritized attributes, which are attributes the guest user indicates to be the most important to them, and accommodation management system 130 stores the ranked prioritized attributes as user preference information in user profile store 230. For example, the user preference information may indicate that a user ranked "modern décor" as their most desired attribute and "rural" as their least desired attribute. In one embodiment, accommodation management system 130 may store user preference information entered by the guest user via guest client device 120. In another embodiment, accommodation management system 130 may derive user preference information for a guest user based on historical booking information stored for the guest user. For example, historical booking information for a guest user may indicate that all of the bookings associated with the guest user are for listings near ski resorts, and user preference information for the guest user may indicate that the guest user prefers ski-friendly accommodations, such as being near lifts and rental shops.

Attribute module 240 determines attributes for listings. As described in reference to the user profile store 230, attributes describe characteristics of a listing, such as specific features, amenities, size, setting, and style of the listing and/or accommodation of the listing. For example, attributes for a listing of an accommodation in Idaho may include: "rustic décor," "snow plow," "rural," "4-bedroom," and "cabin." These attributes indicate that the accommodation is a 4-bedroom cabin with rustic décor in Idaho that includes a snow plow for use by guest users who book the accommodation. Other types of attributes are further described in relation to the equivalence module 240 below.

Attribute module 240 includes a list of possible attributes. Possible attributes are attributes commonly seen in listings and used by attribute module 240 to determine attributes of listings. In some embodiments, attribute module 240 periodically adds new possible attributes to the list of possible attributes to include new possible attributes seen in listings. In some embodiments, a system administrator, who controls settings of accommodation management system 130, may manually input new attributes to accommodation management system 130, or attribute module 240 may automatically determine new possible attributes.

Attribute module 240 determines a set of attributes for each listing and stores each set of attributes in association with the listing in attribute store 250. To determine attributes, attribute module 240 retrieves information describing a listing from listing store 210. In some embodiments, the attribute module 240 performs a syntactic parse of the information for the listing to identify keywords indicating attributes from the list of possible attributes. Additionally or alternatively, attribute module 240 analyzes pictures from the information using pattern-matching or computer vision object identification to identify attributes of the listing. For example, attribute module 240 may determine that a listing titled "Laguna Beach 1-bedroom Condo" and including pictures of a rug with blue and white stripes and a view of the beach from a window has the attributes "1-bedroom," "condo," "striped pattern," "blue and white color palette," "ocean view," "beach access," and "Laguna Beach." In some embodiments, attribute module 240 stores attributes determined for each listing in attribute store 250. In other embodiments, attribute module 240 stores attributes listing store 210 with other information describing listings.

In some embodiments, attribute module 240 comprises a machine learning model that outputs the attributes of a listing. The machine learning model is trained on training data including a set of listings where each listing is labelled with attributes of the listing. The training data may be manually or automatically labelled. The machine learning model may use this training data to learn which characteristics, objects, and keywords in listings correspond to attributes in a predetermined set of attributes. Once trained, the machine learning model receives listings as input from listing store 210. For each inputted listing, the machine learning model outputs a percentage match of the listing to each attribute in the predetermined set of attributes. For example, for a listing titled "Cozy cabin in central Wyoming," the machine learning model may output a 5% match to the attribute "beach access" and a 93% match to the attribute "rustic." Attribute module 240 may store attributes with a percentage match over a threshold value as attributes of the listing in attribute store 250. In particular, for a threshold value of 75%, attribute module 240 would store the attribute "rustic" in attribute store 250 for the listing "Cozy cabin in central Wyoming" but would not store the attribute "beach access."

Equivalence table module 260 determines categories and/or subcategories for attributes and uses the categories and/or subcategories to construct an equivalence table, which contains groups of attributes organized by categories/subcategories. Each category divides attributes into groups corresponding to an overarching theme. For example, the attributes "wood paneling," "birch logs," "clean lines," and "restrained color palette" may be in the category "décor," while the attributes "urban," "takeout food," and "museums" may be in the category "setting." Each category may include one or more subcategories further dividing attributes of the category into groups. Subcategories may describe types or further nuanced groups of each category. Returning to the example, the attributes "wood paneling" and "birch logs" may be in the subcategory "rustic," which is a type of décor. Further, some attributes may be located in multiple categories and/or subcategories. For example, the attribute "infinity pool" may be in an "amenities" category as well as a "swimming" subcategory of a "features" category.

In some embodiments, equivalence table module 260 comprises a machine learning model that determines categories and/or subcategories of attributes. The machine learning model is trained on training data including a set of possible attributes, each possible attribute labelled with one or more categories and subcategories. The training data may be manually or automatically labelled. The machine learning model may use this training data to learn which attributes correspond to various categories and subcategories. Once trained, the machine learning model receives possible attributes as input. For each inputted attribute, the machine learning model outputs a percentage match of the attribute to one or more categories or subcategories. Equivalence table module 260 may construct the equivalence table using attributes corresponding to categories and/or subcategories with a percentage match over a threshold value. In other embodiments, a system administrator enters categories and subcategories via a user interface of accommodation management system 130 and manually maps the possible attributes to each of the categories and subcategories to create the equivalence table. The equivalence table is further described in relation to FIGS. 3A-3B.

Equivalence module 280 determines comparable listings for canceled bookings. The term comparable listing, as used herein, refers to a listing that is similar to a listing of a canceled booking based on attributes of each listing. Equivalence module 280 retrieves attributes of a listing from attribute store 250. Equivalence module 280 retrieves the categories and subcategories from equivalence table store 270, and for each attribute for the listing, equivalence module 280 maps the attribute to one or more of the categories and subcategories. In some embodiments, a category may include only one other attribute, known as a direct substitute for the mapped attribute. For each category or subcategory, equivalence module 280 retrieves the other attributes in the category or subcategory from equivalence table store 270. Equivalence module 280 groups all of the retrieved attributes as similar attributes for the mapped attribute. In some embodiments, equivalence module 280 only groups attributes that occur in a threshold number of the categories or subcategories of the mapped attribute as similar attributes.

Equivalence module 280 determines comparable listings, which are listings with at least one or more similar attributes. Equivalence module 280 retrieves information on listings from listing store 210 and attributes of the listings from attribute store 250 and uses the information and attributes to determine comparable listings. In some embodiments, equivalence module 280 retrieves availability information from listing store 210 and uses the availability information to determine available comparable listings. In other embodiments, equivalence model 280 only uses either available homestay listings or available hotel listings from listing store 210 as comparable listings. In some embodiments, equivalence module 280 uses any listing containing a similar attribute as a comparable listing. In other embodiments, equivalence module 280 uses listings with at least a threshold number of similar attributes as comparable listings. Further, equivalence module 280 may retrieve ranked prioritized attributes for the guest user from user profile store 230 and determines comparable listings that include at least one or more similar attributes and at least one or more ranked prioritized attributes. In further embodiments, a portion of the similar attributes may be considered upgrade attributes, which are attributes describing accommodations that are of higher quality than the accommodation of the canceled booking. Equivalence module 280 may determine a set of upgrade attributes from the similar attributes and determine comparable listings that include at least one upgrade attribute.

Equivalence module 280 scores the comparable listings based on the similar attributes. In some embodiments, the score for each comparable listing is the number of similar attributes of the listing. For example, a comparable listing with 7 similar attributes and a comparable listing with 4 similar attributes would have scores of 7 and 4, respectively. In other embodiments, the score is a weighted combination of the similar attributes of the comparable listing. In these embodiments, equivalence module 280 retrieves user preference information for the guest user of the canceled booking from user profile store 230 and weights each similar attribute based on the user preference information. For example, each similar attribute may be given a baseline score of 1 and be weighted based on rankings of prioritized attributes by the guest user. In other embodiments, different bases for weighting the attributes may be used.

Equivalence module 280 ranks the comparable listings based on the scores. Equivalence module 240 retrieves availability information from the listing store 210 for the comparable listings and removes any comparable listing from the ranking that is unavailable for the time period of the canceled booking. Equivalence module 280 selects a comparable listing to book based on the rankings. In some embodiments, equivalence module 280 selects the highest ranked listing. In other embodiments, equivalence module 280 selects a top percentage of the ranked comparable listings to send to the guest user to choose from for booking.

In some embodiments, equivalence module 280 uses a machine learning module to determine comparable listings for a canceled booking. To train the machine learning model, equivalence module 280 retrieves information describing historical bookings from booking store 220 and attributes of each listing for each historical booking via attribute module 240. In some embodiments, equivalence model 280 only retrieves historical bookings for hotel listings to train the machine learning model with. Equivalence module 280 determines one or more booking types for each historical booking by mapping attributes and other information of the historical booking to a set of booking types. In some embodiments, the booking types correspond to categories and subcategories of the equivalence table that encompass a particular theme or experience for the accommodation of the historical booking. For example, the categories "Mission district" and "bohemian" may be used as booking types while the subcategory "beds" may not. In other embodiments, equivalence module 280 stores predetermined booking types that correspond to particular attributes, categories, and subcategories of the equivalence table. For example, the booking type "rustic experience" may correspond to the attributes "rural," "quiet," "cabin," "outdoor shower," the category "rustic décor," and the subcategories "homestay," "bunk beds," and "hiking." Equivalence module 280 labels each historical booking with the determined booking type (or booking types) and trains the machine learning model with the labelled historical bookings. In some embodiments, equivalence module 280 retrains the machine learning model periodically on new historical bookings.

Equivalence module 280 determines one or more candidate listings to book in place of a canceled booking using the machine learning model. Equivalence module 280 retrieves a set of available listings from listing store 210 as candidate listings and inputs the candidate listings and listing of the canceled booking to the machine learning model. In embodiments where the machine learning model is trained on historical bookings for hotel listings, equivalence model 280 retrieves a set of available hotel listings form listing store 210 as candidate listings. The machine learning model outputs a percentage match between the canceled listing and each of the candidate listings. Equivalence module 280 selects one candidate listing for booking based on the percentage matches. In some embodiments, equivalence module 280 ranks the candidate listings by percentage match and selects the highest ranked candidate listing as a comparable listing for booking. In other embodiments, equivalence module 280 selects a top portion of the ranked candidate listings as comparable listings to send to the guest user to choose from for booking.

In some embodiments, equivalence module 280 selects more than one comparable listing for a canceled booking to send to user interface module 295 to receive input from the guest user about which comparable listing to select for booking. Equivalence module 280 may send the comparable listings in a ranked order based on user preference information retrieved from user profile store 230. In these embodiments, equivalence module 280 compares the attributes with percentage matches over a threshold value to the user profile information from user profile store 230 and ranks the comparable listings based on the user profile information and the percentage matches. Equivalence module 280 sends, via a user interface from user interface module 295, the ordered icons representing the ranked comparable listings along with a drop-down menu that indicates criteria for ranking the comparable listings. For example, the criteria may include ranking by user preference information, closest match to the canceled booking, or the inclusion of specific attributes. Equivalence module 280 may receive, via the user interface from user interface module 295, a user selection from the drop-down menu to organize each icon based on specific criteria, re-rank the comparable listings based on the specific criteria, and command user interface module 295 to automatically move the icons on the user interface to positions reflected the order of the re-ranked comparable listings.

Equivalence module 280 receives, from user interface module 295, input from the user interface indicating a selection of the comparable listings for booking. For example, if the input indicates that the guest user prefers one of the comparable listings over the others, equivalence module 280 selects the preferred comparable listing for booking. In some embodiments, if the input indicates that the guest user rejected all of the comparable listings for replacing the canceled booking, equivalence module 280 may select new comparable listings to send to the guest user either from the previously scored comparable listings or by rescoring the comparable listings without the rejected comparable listings. In other embodiments, equivalence module 280 may send a selected listing to user interface module 295 to receive confirmation from a guest user before booking the listing.

Reservation module 285 determines listings to reserve for a region to replace the listings of canceled bookings. Reservation module 285 retrieves information describing listings for the region from listing store. In some embodiments, reservation module 285 only retrieves information describing listings currently available for booking on accommodation management system 130 from the available sub-data store of listing store 210. In other embodiments, reservation module 285 retrieves information describing any listings ever available for the region. Reservation module 285 retrieves attributes of the listings from attribute module 240 and determines common attributes of the listings in the region. In some embodiments, common attributes are attributes that occur in a threshold percentage of the listings.

Reservation module 285 retrieves historical bookings from booking store 220 and determines, based on the historical bookings, a historical cancelation rate of bookings for the region. In some embodiments, the historical cancelation rate is the percentage of canceled historical bookings in the region. In other embodiments, the historical cancelation rate is the number of historical bookings canceled during a set time frame.

Reservation module 285 determines an amount of listings to reserve for a time period based on the cancelation rate. In some embodiments, the amount is number of bookings that have been historically canceled. In other embodiments, reservation module 285 compares the cancelation rate to a threshold value. If the cancelation rate exceeds or equals the threshold value, reservation module 285 uses the product of the amount of available listings in the region for the time period and the cancelation rate, and if the cancelation rate is less than the threshold value, reservation module 285 uses a baseline value for the amount. The baseline value may be predetermined specific to the number of listings in the region or may be standard across all regions.

Reservation module 285 selects a set of listings to reserve based on the amount. In some embodiments, reservation module 285 selects listings with the highest guest user rankings. In other embodiments, reservation module 285 retrieves attributes for all available listings of the region from attribute module 240. Reservation module 285 categorizes each listing into a listing type. Each listing type includes a set of similar attributes. For example, a listing with the attributes "downtown," "urban," "1-bedroom," "artsy," and "craftsman" may have be categorized to the listing type "urban bungalow." In some embodiments, the listing types correspond to categories of the equivalence table. Using the historical booking information, reservation module 285 determines a percentage of historical cancelations for each listing type and determines, based on the percentages, a subset of available listings to reserve for each listing type.

In some embodiments, reservation module 285 uses a machine learning model to select a set of listings to reserve. The machine learning model is trained on training data including a set of historical bookings labelled with a booking type and an indication of whether the booking was previously canceled. The training data may be manually or automatically labelled. Once trained, the machine learning model receives available listings for the region over a time period as input, along with the attributes of each available listing, and outputs a percentage match of each available listing indicating a likelihood of matching an ideal listing for the region, which is a listing that may be beneficial to reserve. Reservation module 285 may rank each available listing based on the percentage matches, and select available listings to reserve based on the rankings and amount.

Reservation module 285 reserves the selected listings. Reservation module 285 moves the selected listings from the available sub-data store of listing store 210 to the reserved sub-data store. In some embodiments, reservation module 285 books each selected listing by storing information about the listing indicating that the booking is reserved for a future guest user in booking module 220. Reservation module 285 may reserve each listing for a set time period and may determine other listings to reserve for subsequent time periods to avoid reserving the same listings over most time periods. Reservation module 285 may also remove reservations for listings once the time period of the reservation has passed.

Booking module 290 books a new listing to take the place of a canceled booking. Booking module 290 retrieves a selected listing from equivalence module 280 and retrieves information describing the listing from listing store 210. In some embodiments, booking module 290 only books a listing for a guest user if equivalence module 280 indicates that the guest user approved the listing via input from a user interface. In other embodiments, booking module 290 auto-books a listing for a guest user. In further embodiments, booking module retrieves reserved listings from listing store 210 to book in place of a canceled booking. Booking module 290 creates a new booking in booking store 220 using the listing, time period, guest user, and information from the listing store. In some embodiments, booking module 290 populates the data structure of booking store 220 with a new connection between the listing and guest user labelled with the time period to reserve the listing for the guest user.

User interface module 295 creates user interfaces to send to the host client device 110 and guest client device 120. Such user interfaces may show information describing listings and bookings, user profile information, and other information stored by accommodation management system 130. User interface module 295 may retrieve information inputted via host client device 110 and guest client device 120, such as user profile information or user preference information. Example user interfaces are described in relation in FIGS. 4-8B.

User interface module 295 sends and receives indications from host client device 110. User interface module 295 may send indications to host client device 110 that a guest user has booked a listing for a time period, that a guest user has canceled a booking, or that accommodation management system 130 has reserved a listing for a specific time period. User interface module 295 may receive indications from host client device 110 that a host user has canceled a booking or listed a new listing.

User interface module 295 also sends requests for input for display to guest client device 120. User interface module 295 may receive a set of listings from equivalence module 280. User interface module 295 sends the set of listings for display on guest client device 120 as recommendations to the guest user and receives a selection of a listings for the set to book. In some embodiments, user interface module 295 may send a set of listings to the user in response to receiving an indication that a booking for the guest user was canceled within a threshold amount of time of the time period of the booking, such as by a host user a week before the time period. In some embodiments, user interface module may receive an indication from guest client device 120 that the guest user has rejected each of the set of listings, and user interface module 295 may request a new set of listings to send to guest client device 120. User interface module 295 may send a command to booking module 290 to book the selection or may send the selection back to equivalence module 280. In some embodiments, booking module 290 may automatically book a listing for a guest user in response to a booking cancelation, so user interface module 295 may send an indication to guest client device 120 that a new booking was made to replace the canceled booking.

Example Equivalence Table

Figure 3B:

FIGS. 3A-3C illustrates an example of portions of an equivalence table 300. In FIG. 3A, the portion 300A includes categories 305 and subcategories 310 for attributes. The categories 305 describe a theme for a set of attributes. For example, categories of the equivalence table 300 include "décor" 305A, "setting" 305B, and "features" 305C. The subcategories 310 describe themes within the categories. For example, the category "décor" 305A, include subcategories "art deco" 310A and "coastal" 310B, which are both types of décor. The attributes in each of these subcategories 310 are common to that type of décor. For example, listing with art deco may have "curved furniture" 315 or a "geometric window" 320, while coastal décor may include a "surfboard" 325. Categories 305 and subcategories 310 may each contain the same attributes. For example, the subcategories "Coogee" 310D and "Surry Hills" 310E both have "cafes" 335. In addition, the attributes may describe specific features of a category 305 of subcategory 310. For example, "circular quay" is near the "opera house" 330, which is a unique attribute to the "setting" 305B of "Circular Quay" in Sydney Australia.

FIG. 3B shows a portion 300B that includes the category "direct substitutes" 305D. The attributes in this portion map directly to one another as shown by arrow 340. For example, a "hot tub" 345 maps directly to a "plunge pool" 350 and vice versa. Further, if equivalence module 280 is determining comparable listings for a listing with a hot tub, equivalence module 280 may uses both the attribute "hot tub" as well as the attribute "plunge pool" as similar attributes for the listing. In some embodiments, if there is a direct substitute for an attribute, equivalence module 280 may only retrieve comparable listings including either the attribute or its "direct substitute" 305D attribute. In other embodiments, if an attribute has no direct substitute and otherwise does not map to a set of attributes in the equivalence table 300, equivalence module 280 may only retrieve comparable listings including the attribute.

FIG. 3C shows a portion 300C that includes the category "space" 305E. This category 305 includes attributes that may be specific to homestay listings 355 that map to attributes of commercial listings 360. For example, in the subcategory "size" 310J, a homestay listing 355 that is a "studio apartment" may be equivalent to a commercial listing 360 that is a "hotel room with a kitchenette" 370, as indicated by arrow 375. In another example, a homestay listing 355 with "1 queen bed and 1 sofa bed" 380 may be equivalent to a commercial listing with "2 queen beds" 382," "1 king bed and 1 sofa bed" 384, or "1 queen bed and 1 rollaway bed" 386, as indicated by arrows 390.

Example User Interfaces

Figure 4:
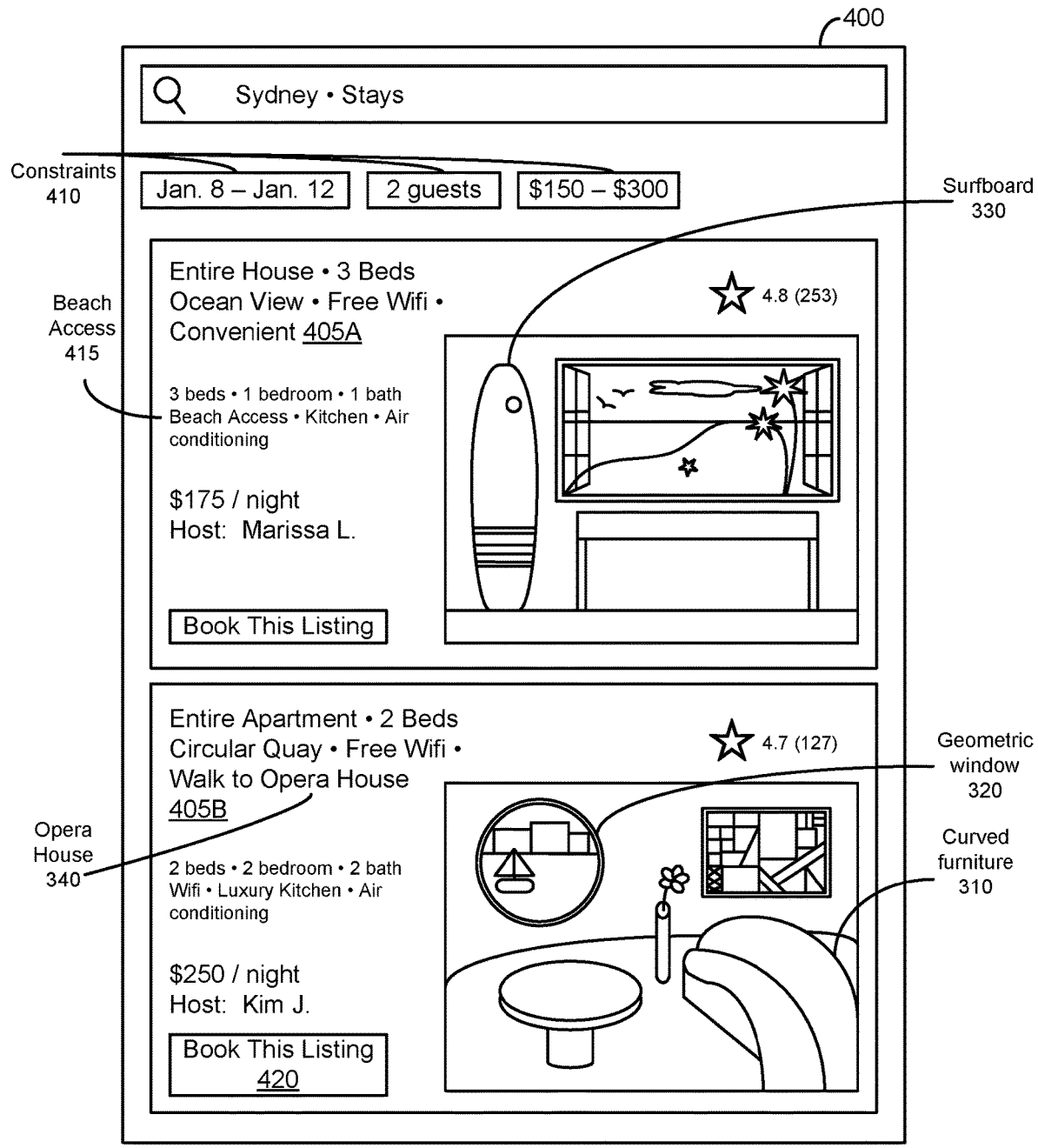
FIG. 4 illustrates an example user interface showing listings for accommodations, according to one embodiment.

FIG. 4 illustrates an example user interface 400 showing listings 405 for accommodations. Each listing includes information describing the accommodation, price, and guest user reviews for a range of constraints 410 and has multiple attributes. For example, listing 405A includes the attributes "beach access" 415 and "surfboard" 330, which map to the subcategories "coastal" 310B and "swimming" 310F in the portion 300A of the equivalence table in FIG. 3A. Listing 405B includes the attributes "Opera House" 340, "geometric window" 330, and "curved furniture" 310, which map to the subcategories "Circular Quay" 330 and "art deco" 310A in the portion 300A of the equivalence table in FIG. 3A. The user interface includes a button for a guest user to "book this listing" 420. In some embodiments, the user interface 400 may include buttons or other interactive widgets for a guest user to filter the listings or otherwise interact with the user interface 400.

Figure 5:
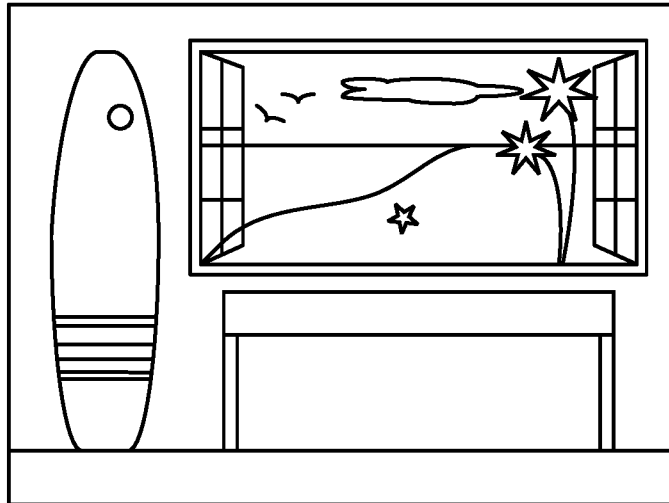
FIG. 5 illustrates an example user interface showing a booking for an accommodation, according to one embodiment.
Figure 5:
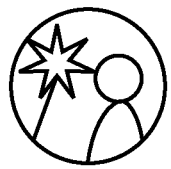
Figure 5:

FIG. 5 illustrates an example user interface 500 showing a booking for an accommodation. The user interface includes information describing the booking, such as the name of the listing, features and amenities of the listing, the time period of the booking, the name of the host user of the lasting, the price of the booking, and guest user reviews of the booking. The user interface 500 also includes buttons for a guest user to interact with to "contact host" 505 or "cancel booking" 510. In other embodiments, the user interface 500 may include other interactive widgets for a guest user to interact with the user interface 500.

Figure 6:
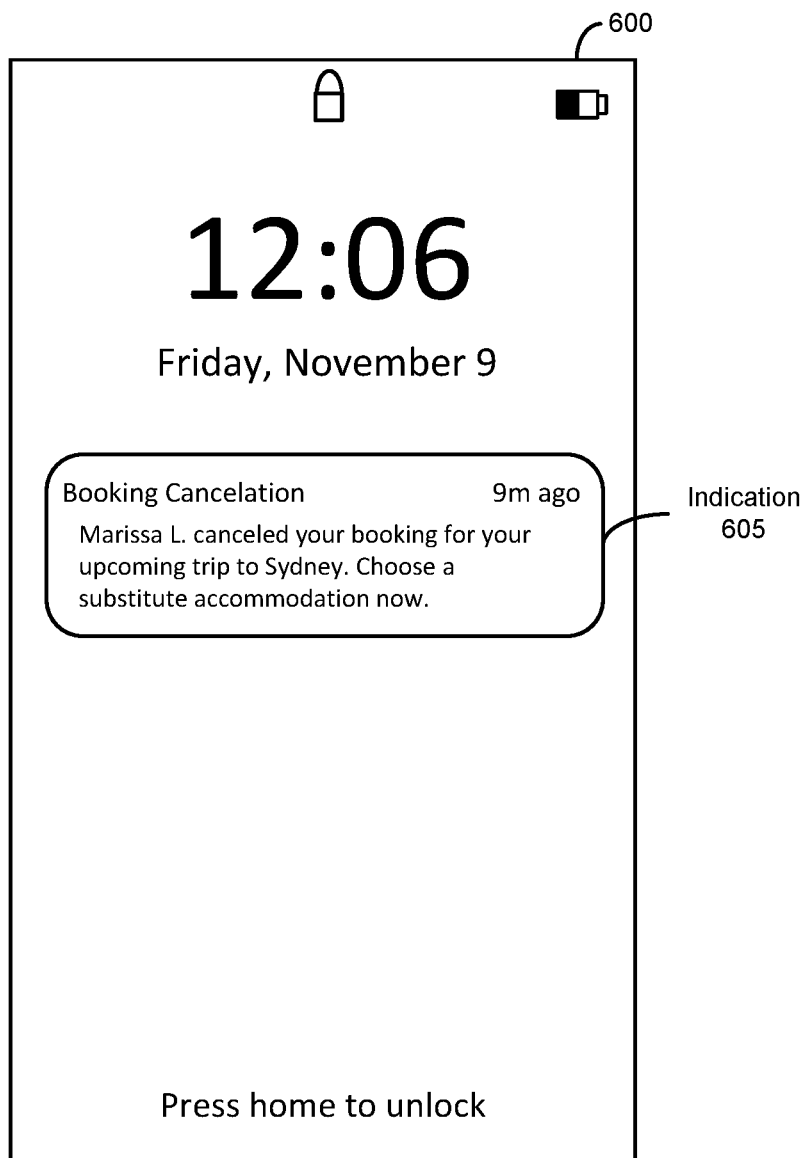
FIG. 6 illustrates an example notification of a booking cancelation, according to one embodiment.

FIG. 6 illustrates an example indication 605 of a booking cancelation. In this example, the indication 605 is shown on a lock screen 600 of guest client device 120. The indication 605 indicates that a host user "Marissa L." canceled the guest user's booking. In some embodiments, the guest user may interact with the indication 605 to choose a new listing to book as a replacement for the canceled booking or to see a listing automatically booked by accommodation management system 130.

Figure 7:
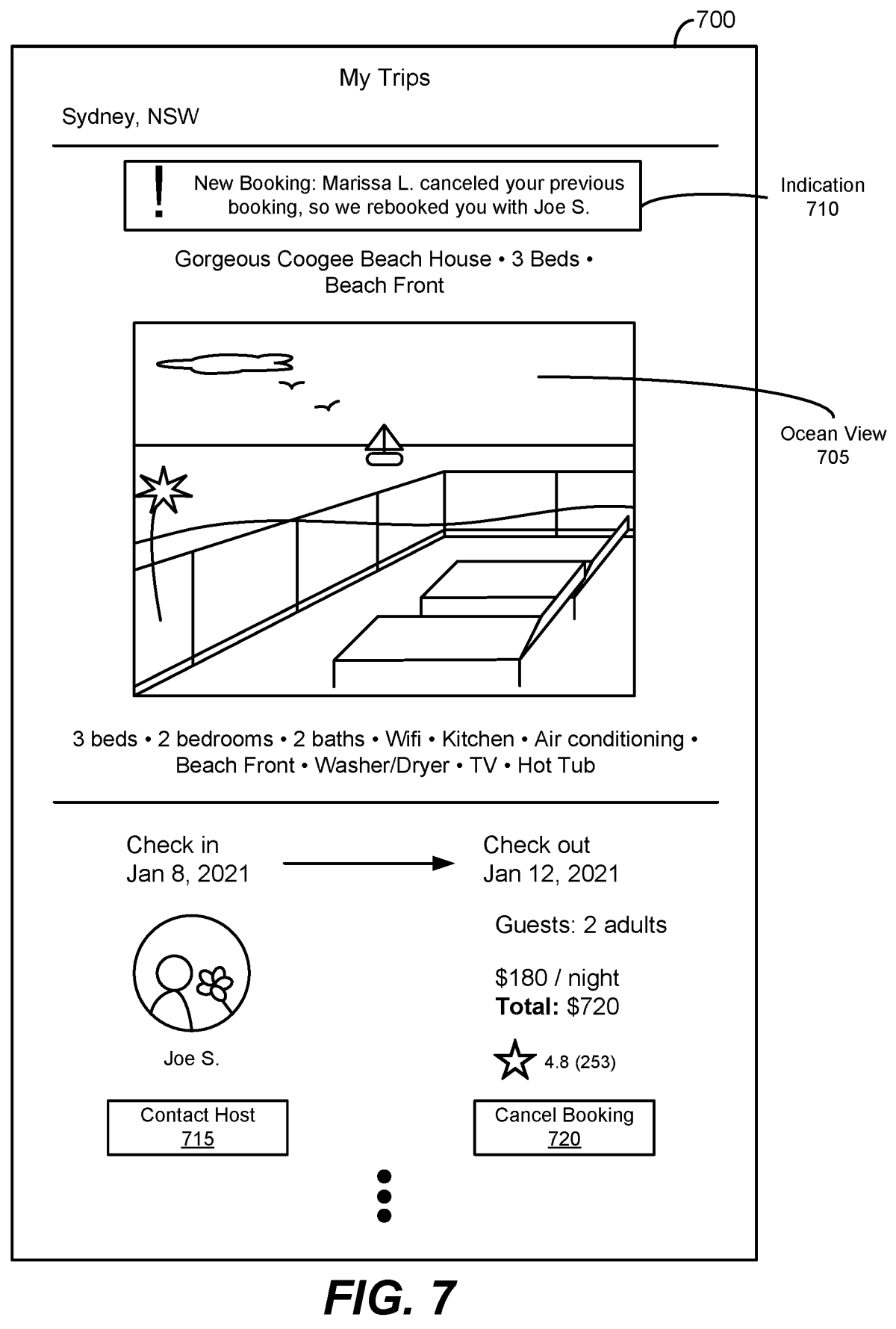

FIG. 7 illustrates an example user interface showing an automatic rebooking. The user interface 700 includes information describing the new booking that replaced the canceled booking shown in FIG. 5. The new booking is for the same time period as the canceled booking and includes similar attributes to the canceled booking, such as an "ocean view" 705. The user interface 700 also includes an indication 710 to the user that the canceled booking was replaced and buttons for a guest user to interact with to "contact host" 715 or "cancel booking" 720. In other embodiments, the user interface 700 may include other interactive widgets for a guest user to interact with the user interface 700.

Figure 8A:
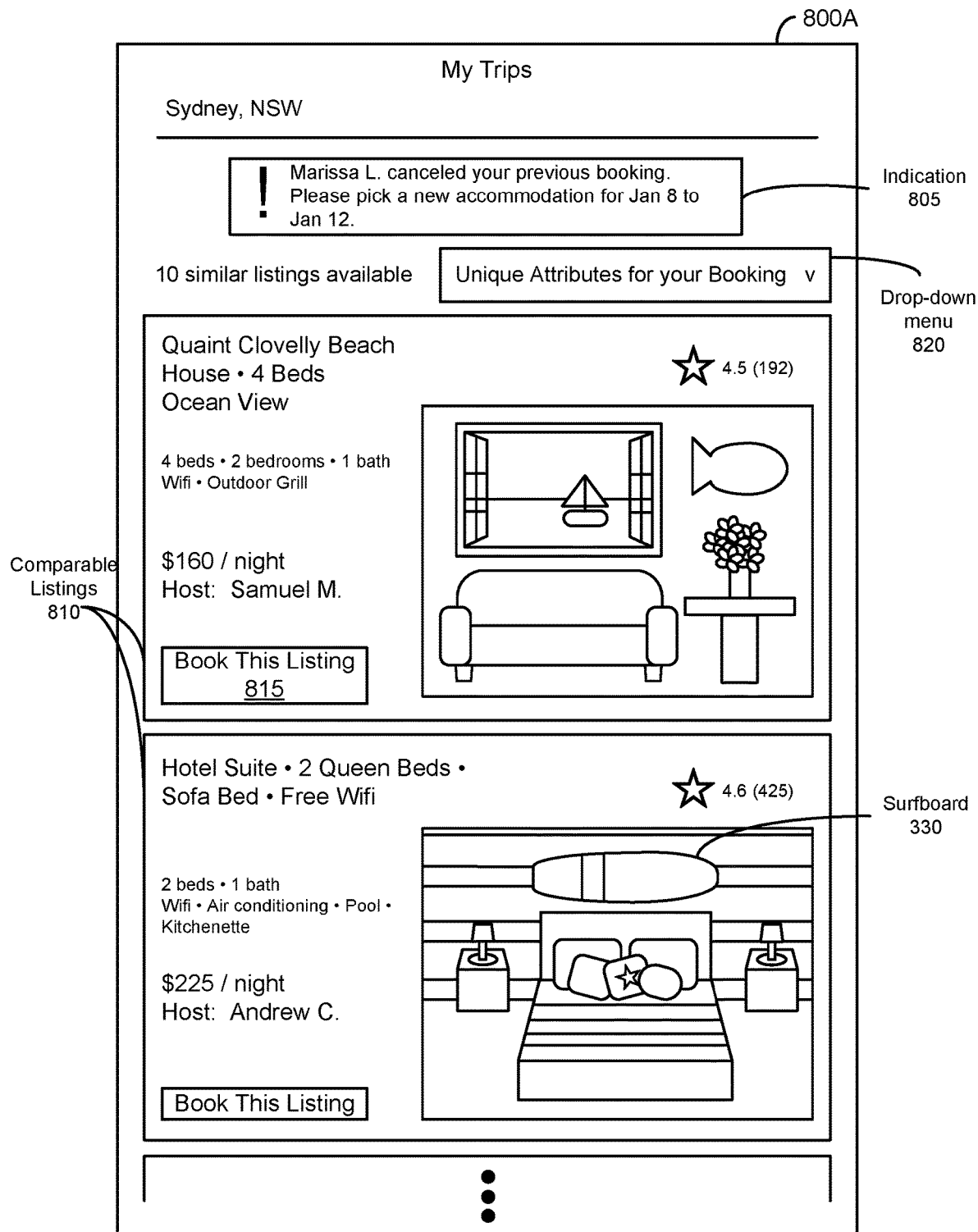
FIGS. 8A-8B illustrate an example user interface showing listings options for replacing a canceled booking, according to one embodiment.
Figure 8B:
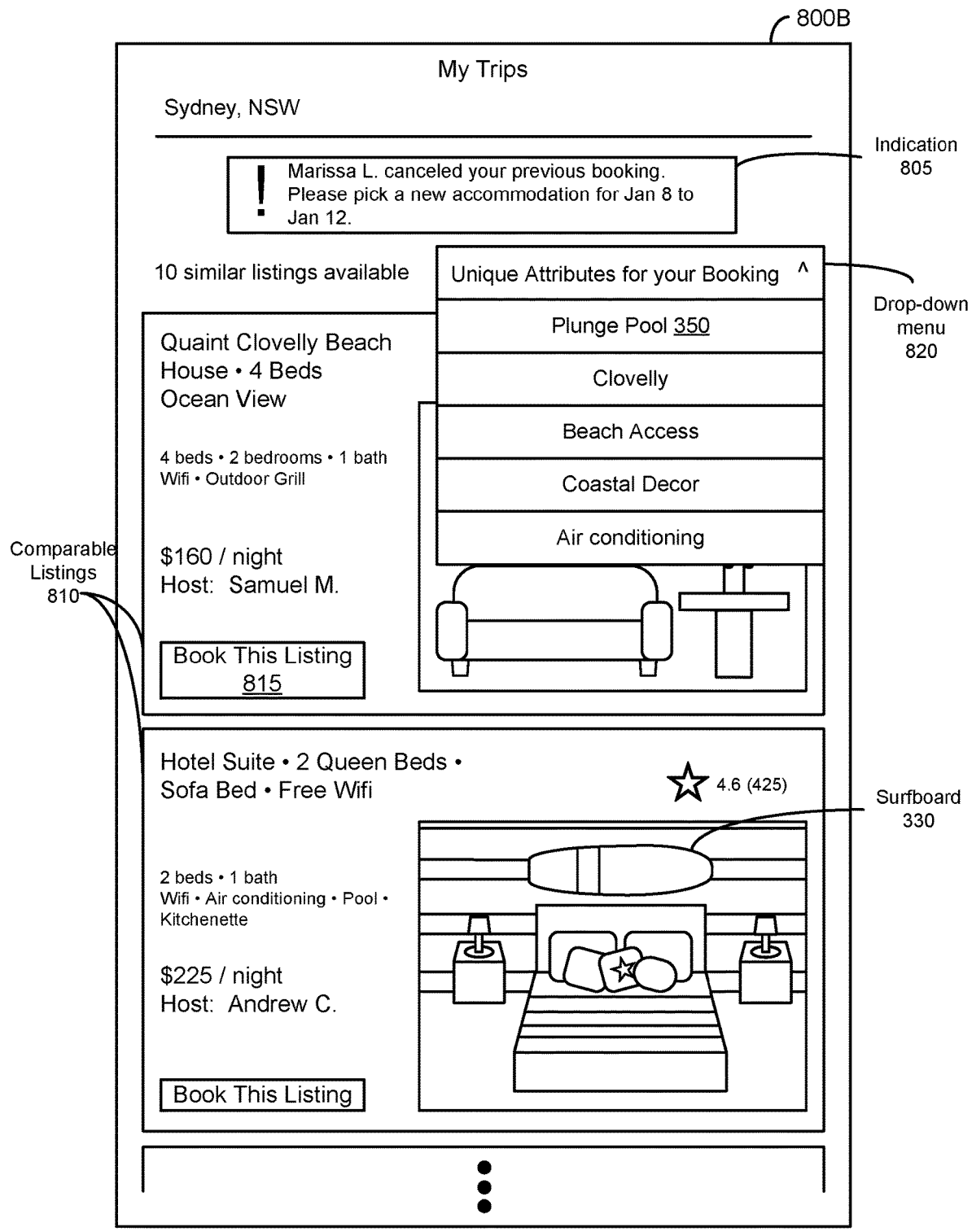

FIGS. 8A-8B illustrate an example user interface 800 showing comparable listings 810 as recommended options for replacing a canceled booking. In FIG. 8A, the user interface 800A includes an indication 805 that the previous booking was canceled and the guest user needs to pick a new listing to book. The user interface 800 shows multiple comparable listings 810 as options for booking. These comparable listings 810 are similar to the listing of the canceled booking shown in FIG. 5 as they include similar attributes, such as a "surfboard" 330, and are available for the same time period. The user interface 800 also includes buttons that the guest user may interact with to "book this listing" 815 and a drop-down menu 820 of unique attributes the guest user may select from to filter the comparable listings 810.

As shown in the example user interface 800B of FIG. 8B, the drop-down menu 820 includes attributes that the guest user may want the comparable listings 810 to include, such as a "plunge pool" 350, among other attributes. In some embodiments, the user interface module 295 may chose the attributes to be displayed via the drop-down menu 820 based on user preference information. In other embodiments, the user interface module 295 may chose the attributes to be displayed based on common attributes or upgrade attributes in the comparable listings 810. Further, in some embodiments, the user interface 800 may include more interactive widgets for the user to filter the comparable listings 810, rank the comparable listings 810 by different criteria, or request a new set of comparable listings 810, among other actions.

Computing Machine Architecture

Figure 9:
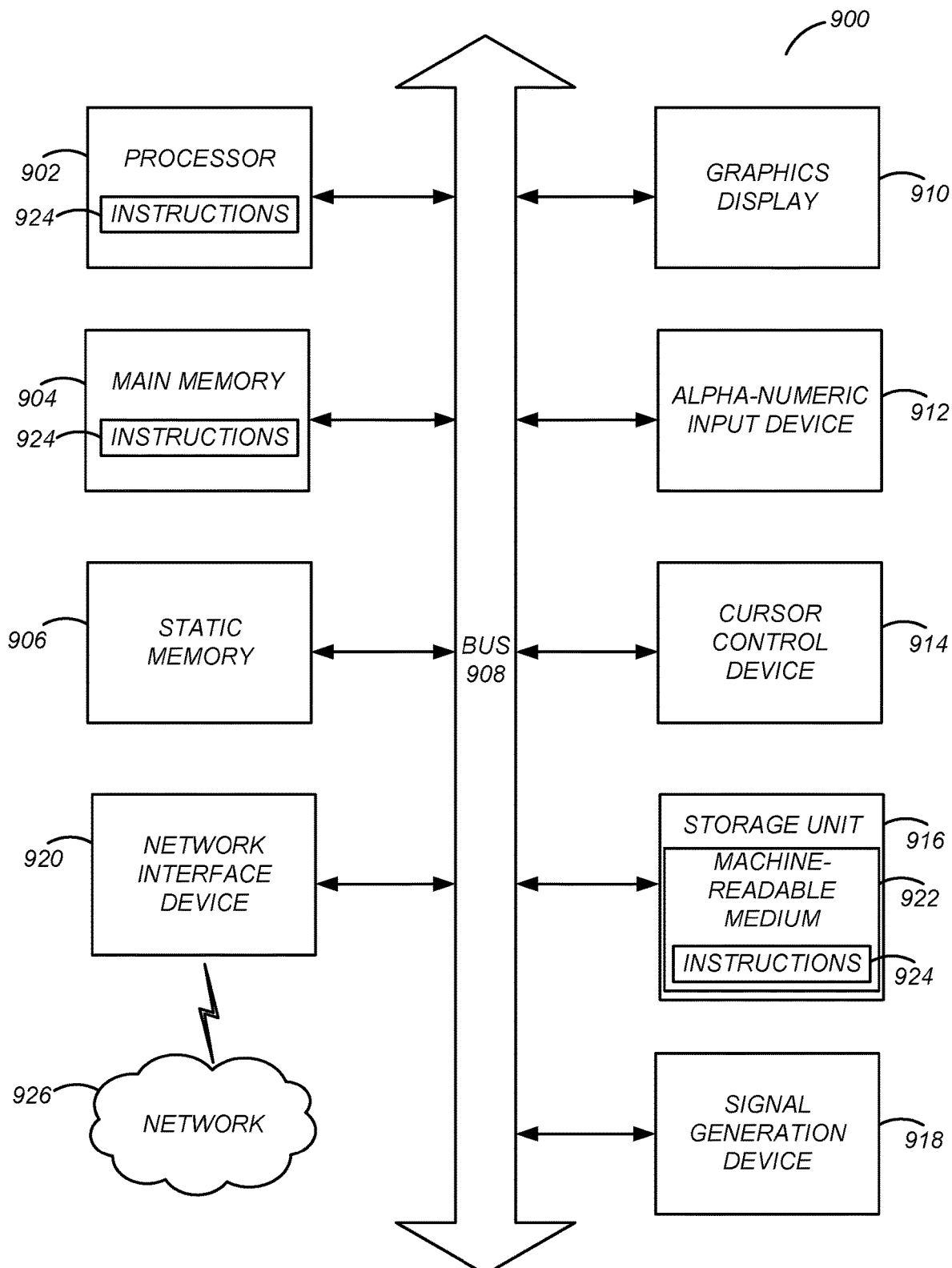
FIG. 9 is a block diagram illustrating components of an example machine able to read instructions from a machine-readable medium and execute them in a processor (or controller).

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 900 includes a processor 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include visual display interface 910. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 910 may include or may interface with a touch enabled screen. The computer system 900 may also include alphanumeric input device 912 (e.g., a keyboard or touch screen keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

Exemplary Use Case—Determining Comparable Listings

The above-described components of accommodation management system 130 and application 125 enable a system where comparable listings of a canceled booking may be determined and booked. For example, a host user may cancel, via user interface of application 125A, a booking for a listing booked by a guest user for a time period. Application 125A may notify accommodation management system 130 each time a booking is canceled and may determine a new listing to book for the guest user for the same time period.

Figure 10:
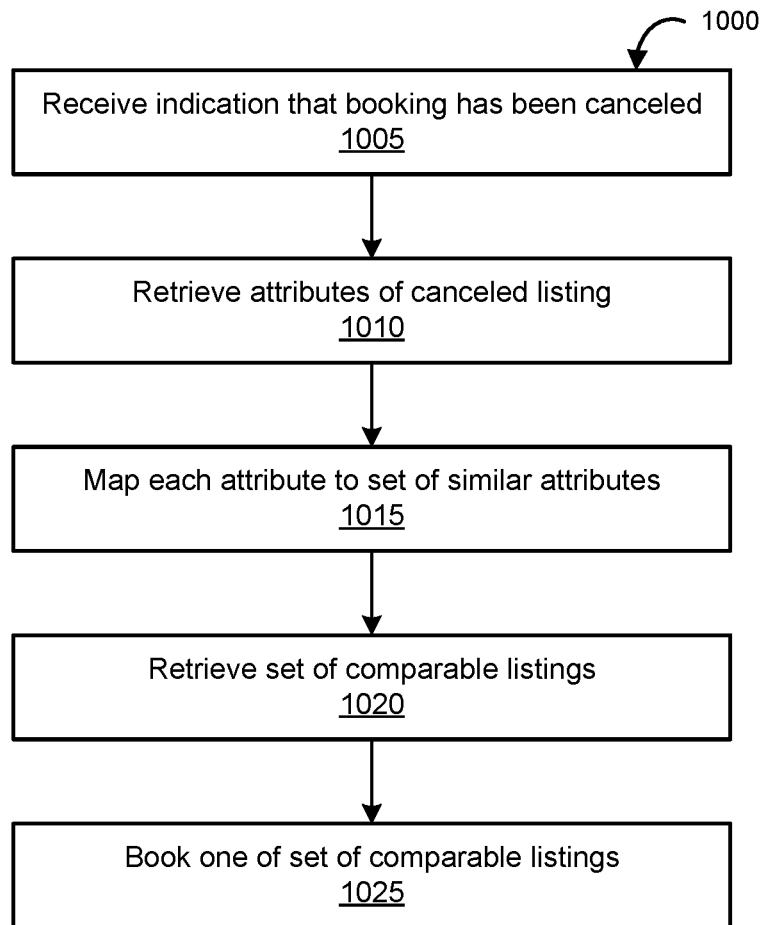
FIG. 10 illustrates a process for booking a comparable listing to replace a canceled booking, according to one embodiment.

FIG. 10 illustrates a process 1000 for booking a comparable listing to replace a canceled booking, according to one embodiment. User interface module 295 receives 1005 an indication that a booking by a guest user has been canceled. In some embodiments, accommodation management system 130 removes a connection between the guest user and the canceled listing in a booking store 220. The booking is associated with a canceled listing and a time period. Equivalence module 280 retrieves 1010, from attribute store 250, attributes of the canceled listing and maps 1015 each attribute of the canceled listing to a set of similar attributes in an equivalence table 300 from equivalence table store 270. In some embodiments, equivalence module 280 maps each attribute to a category 305 in the equivalence table 300 and retrieves the attributes in the category 305 as a set of attributes. Equivalence module 280 determines which retrieved attributes occur a threshold number of times in the sets of attributes and uses these attributes as similar attributes.

Equivalence module 280 retrieves 1020 a set of comparable listings 810 from listing store 210. Each comparable listing 810 includes one or more of the similar attributes and is available for booking during the time period. In some embodiments, equivalence module 280 uses a machine learning model to determine the set of comparable listings 810. Booking module 290 books 1025 one of the set of comparable listings 810 for the guest user during the time period by populating a booking data structure with a connection between the comparable listing 810 and the guest user. In some embodiments, booking module 290 books the comparable listing 810 if a host user canceled the booking within a threshold amount of time of the time period and reserves the comparable listing 810 for the guest user if the host user did not cancel the booking within the threshold amount of time. User interface module 295 may send for display to the guest user an indication 605 that the booking was canceled, an indication 710 that the booking was automatically replaced, or a set of one or more comparable listings 810 for the guest user to choose between for rebooking. In some embodiments, the guest user may reject the comparable listings, and user interface module 295 may send a new set of comparable listings 810 for the guest user to choose from.

Exemplary Use Case—Determining Comparable Hotel Listings

The above-described components of accommodation management system 130 and application 125 enable a system where comparable hotel listings of a canceled booking may be determined and booked. For example, a host user may cancel, via user interface of application 125A, a booking for a listing booked by a guest user for a time period. Application 125A may notify accommodation management system 130 each time a booking is canceled and may determine a hotel listing to book for the guest user for the same time period.

Figure 11:
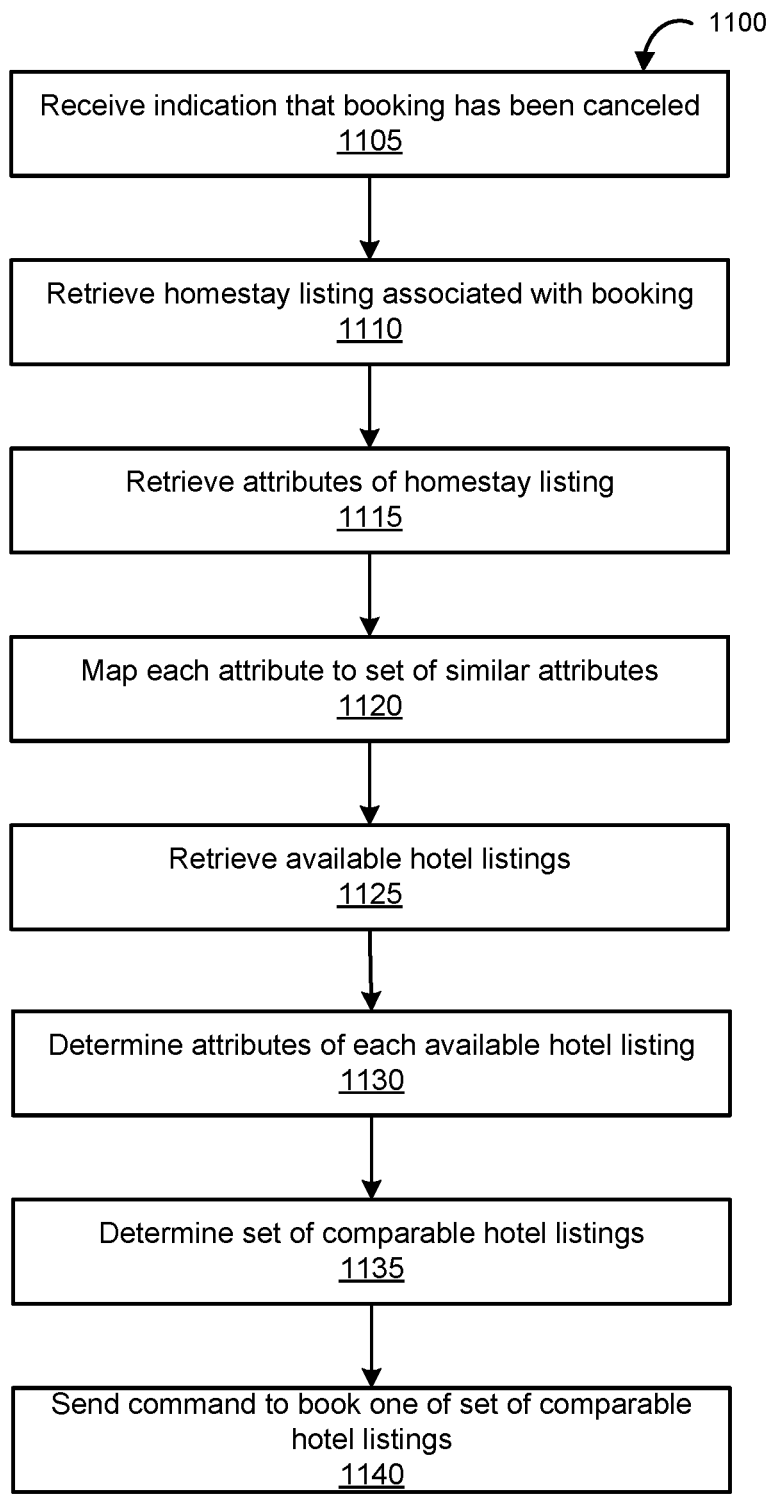
FIG. 11 illustrates a process for booking a comparable hotel listing to replace a canceled booking, according to one embodiment.

FIG. 11 illustrates a process 1100 for booking a comparable hotel listing to replace a canceled booking, according to one embodiment. User interface module 295 receives 1105 an indication that a booking for a listing over a time period by the guest user has been canceled by a host user or otherwise unexpectedly. Accommodation management system 130 retrieves 1110 a homestay listing associated with the booking from listing store 210. The homestay listing specifies a region. Equivalence module 280 retrieves 1115 attributes of the homestay listing form attribute module 240 and maps 1120 each attribute of the homestay listing to a set of similar attributes in an equivalence table 300 from equivalence table store 270. In some embodiments, equivalence module 280 maps each attribute to a category 305 in the equivalence table 300 and retrieves the attributes in the category 305 as a set of attributes. Equivalence module 280 determines which retrieved attributes occur a threshold number of times in the sets of attributes and uses these attributes as similar attributes.

Equivalence module 280 retrieves 1125 a set of available hotel listings in the region during the time period from listing store 210. Attribute module 240 determines 1130 attributes of each of the set of available hotel listings, and equivalence module 280 retrieves the attributes from attribute store 250 and determines 1135 a set of comparable hotel listings from the set of available hotel listings. Each comparable hotel listing includes a threshold set of similar attributes. In some embodiments, equivalence module 280 uses a machine learning model to determine the set of comparable hotel listings.

Equivalence module 280 sends a command to booking module 290 to book one of the set of comparable hotel listings for the guest user during the time period. In some embodiments, booking the comparable hotel listing is controlled by a separate accommodation management system that is hosted outside of accommodation management system 130. In other embodiments, booking module 290 books the comparable hotel listing by populating a booking data structure with a connection between the comparable hotel listing and the guest user. In some embodiments, booking module 290 books the comparable hotel listing if the booking was canceled within a threshold amount of time of the time period and reserves the comparable hotel listing for the guest user if the booking was not canceled within the threshold amount of time. User interface module 295 may send for display to the guest user an indication 605 that the booking was canceled, an indication 710 that the booking was replaced, or a set of one or more comparable listings, which may be homestay listings, hotel listings, or a combination of both, to recommend to the guest user to choose between for rebooking. In some embodiments, the guest user may reject the comparable listings, and user interface module 295 may send a new set of comparable listings for the guest user to choose from.

Exemplary Use Case—Reserving Inventory for Substitution

The above-described components of accommodation management system 130 and application 125 enable a system where listings with common attributes are determined and reserved for a region. For example, accommodation management system 130 may determine a historical cancelation rate for a region and reserve listings to use for when bookings are canceled. Each listing may include common attributes, which are attributes commonly observed in listings booked in the region.

Figure 12:
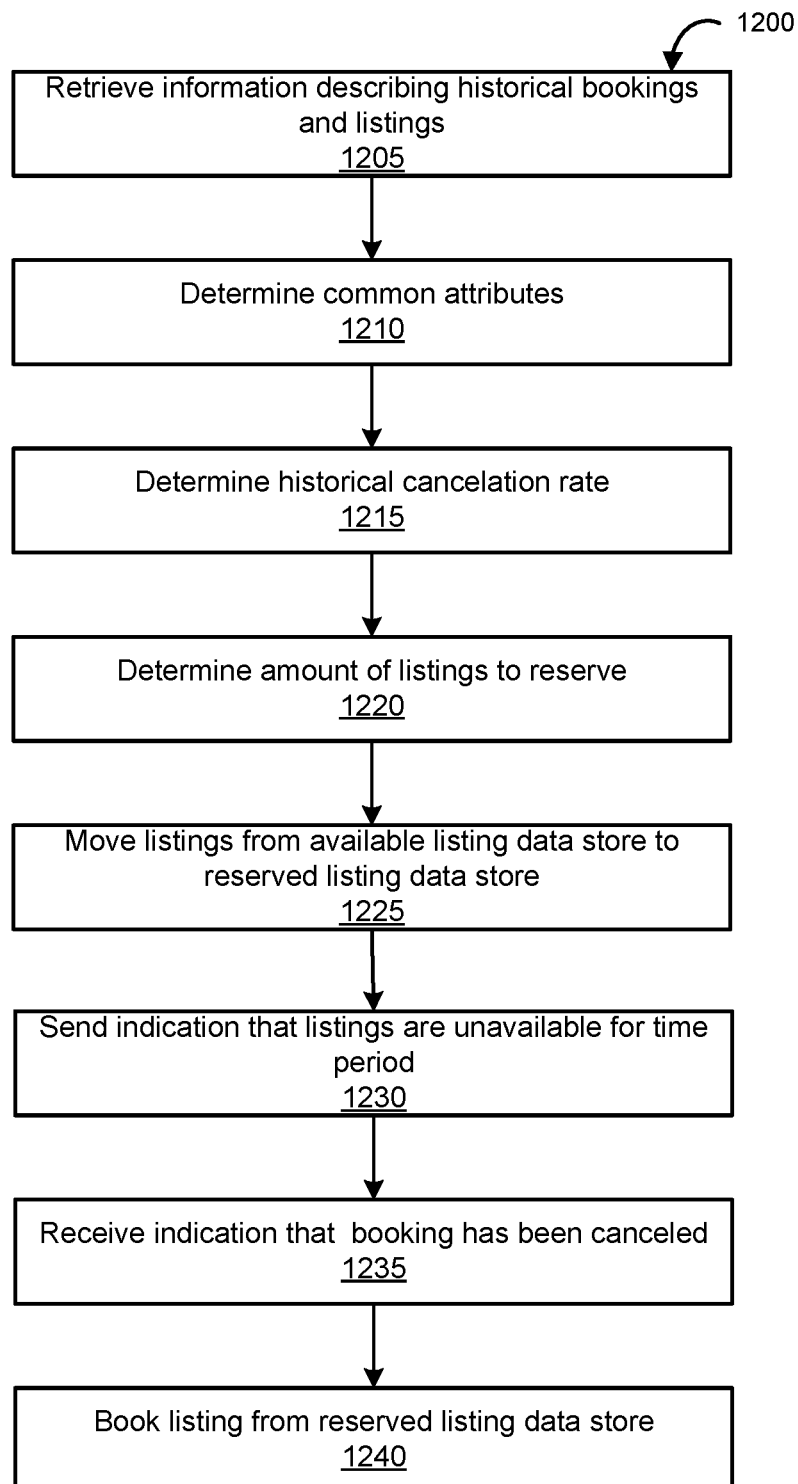
FIG. 12 illustrates a process for reserving listings for a region to book in the place of a canceled booking, according to one embodiment.

FIG. 12 illustrates a process 1200 for reserving listings for a region to book in the place of a canceled booking, according to one embodiment. Accommodation management system 130 retrieves 1205 information describing historical bookings and listings for accommodations in a region from booking store 220 and listing store 210, respectively. Reservation module 285 determines 1210 one or more common attributes of the listings in the region. Reservation module 285 determines 1215, based on the historical bookings, a historical cancelation rate of bookings for the region. In some embodiments, Reservation module 285 categorizes each available listing in the region into a listing type and determines a percentage of historical host user cancelations for each listing type.

Reservation module 285 determines 1220 an amount of listings to reserve for a time period based at least in part on the cancelation rate. In some embodiments, reservation module 285 uses an amount based on the number of available listings in the region for the time period if the cancelation rate is over a threshold value and otherwise uses a baseline amount. In embodiments where reservation module 285 categorized each available listing into a listing type, reservation module 285 determines an amount of listings to reserve for each listing type for the region.

Reservation module 285 moves 1225 the amount of listings for the region from an available sub-data store of listing store 210 to a reserved sub-data store of listing store 210. Each moved listing includes one or more of the common attributes. In some embodiments, reservation module 285 uses a machine learning model to determine which listings to move. User profile module 295 sends 1230 an indication that the listing has become unavailable for the time period to each host user of the moved listings.

User interface module 295 receives 1235 an indication that a booking by a guest user has been canceled, where the canceled booking specifies the region and a subset of the time period. Booking module 290 books one of the listings in the reserved listing data store for the guest user for the time period by populating a booking data structure with a connection between the guest user and the reserved listing. In some embodiments, booking module 290 books the reserved listing if the booking was canceled within a threshold amount of time of the time period. User interface module 295 may send for display to the guest user an indication 605 that the booking was canceled, an indication 710 that the booking was replaced, or a set of reserved listings for the guest user to choose between for rebooking. In some embodiments, the guest user may reject the reserved listings, and user interface module 295 may send a new set of reserved listings for the guest user to choose from.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for booking a new listing to replace a canceled booking through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for replacing a canceled accommodation for a guest user, the method comprising:
    receiving, by a homestay application, an indication that a booking for an accommodation over a time period by the guest user has been canceled by a host user;
    in response to determining that the host user canceled the booking more than a threshold amount of time from the time period, sending, for display to the guest user, an indication that the booking was canceled without an alternative accommodation having been reserved; and
    in response to determining that the host user canceled the booking within the threshold amount of time:
        retrieving, from a listing database of the homestay application, a homestay listing associated with the booking, the homestay listing specifying a region of the accommodation;
        retrieving, from an attribute database of the homestay application, attributes of the homestay listing;
        mapping each attribute of the homestay listing to a set of similar attributes in an equivalence table;
        retrieving, by the homestay application, a set of available hotel listings in the region during the time period;
        determining attributes of each of the set of available hotel listings;
        determining a set of comparable hotel listings from the set of available hotel listings each including a threshold number of similar attributes;
        inputting, to a machine learning model, the homestay listing and a set of candidate hotel listings, wherein the machine learning model is trained by:
            retrieving, from a database of the homestay application, historical homestay listings, each historical homestay listing associated with a set of attributes describing the historical homestay listings;
            retrieving historical hotel listings, each historical hotel listing associated with a set of attributes describing the historical hotel listings;
            determining sets of similar listings based on the attributes of the historical homestay listings and the historical hotel listings;
            labelling each set of similar listings with a booking type; and
            training the machine learning model using the labelled set of similar listings;
        selecting one of the set of comparable hotel listings based on output from the machine learning model;
        sending a command, from the homestay application, to book the one of the set of comparable hotel listings for the guest user during the time period by populating a booking data structure with a connection between the guest user and the one of the set of comparable hotel listings; and
        sending, for display to the guest user, an indication that the canceled accommodation was replaced with an accommodation of the one of the set of comparable hotel listings.

2. The method of claim 1, wherein mapping each attribute of the homestay listing to a set of similar attributes in the equivalence table comprises:
    generating a plurality of set of attributes by, for each attribute of the canceled accommodation:
        mapping the attribute to a category in the equivalence table;

retrieving a set of attributes associated with the category; and determining similar attributes based on attributes that occur in a threshold number of the sets of attributes of the plurality of sets of attributes.

3. The method of claim 1, further comprising:

receiving, from the machine learning model, a percentage match between the homestay listing and each of the set of candidate hotel listings; and sending, for display to the guest user, one or more of the set of candidate hotel listings with a percentage match greater than a threshold value.

4. The method of claim 1, further comprising:

retrieving user profile data for the guest user;

determining a ranked set of prioritized attributes of the guest user based on the user data;

determining a subset of the set of comparable hotel listings each including one or more of a top percentage of the ranked prioritized attributes; and sending, from the homestay application, a command to book one of the subset for the guest user by populating a booking data structure with a connection between the guest user and the one of the subset.

5. The method of claim 4, wherein determining a subset of the set of comparable hotel listings each including one of more of a top percentage of the ranked prioritized attributes comprises:

determining a set of upgrade attributes based on the mapped similar attributes, the upgrade attributes describing accommodations of higher quality than the canceled accommodation; and determining a subset of the set of comparable hotel listings, each comparable hotel listing of the subset including one or more of the upgrade attributes.

6. The method of claim 1, further comprising:

ranking each of the set of comparable hotel listings based on similar attributes and availability for booking during the time period;

selecting a highest ranked comparable hotel listing;

sending a command, from the homestay application to a separate application, to book the highest ranked comparable hotel listing for the guest user during the time period; and sending, for display to the guest user, an indication that the canceled accommodation was replaced with an accommodation of the highest ranked comparable hotel listing.

7. The method of claim 1, further comprising:

sending, for display to the guest user, two or more of the set of comparable hotel listings;

receiving a selection of one of the two or more of the set of comparable hotel accommodations as input from the guest user; and sending a command to book the selection for the guest user during the time period.

8. The method of claim 1, further comprising:

sending, for display to the guest user, two or more of the set of comparable hotel listings;

receiving an indication that the guest user rejected each of the two or more of the set of comparable hotel listings; and sending, for display to the guest user, two or more other comparable hotel listings from the set of comparable hotel listings.

9. A system for replacing a canceled accommodation for a guest user, the system comprising one or more processors configured execute instructions that cause the processor to perform operations of:

receiving, by a homestay application, an indication that a booking for an accommodation over a time period by the guest user has been canceled by a host user;

in response to determining that the host user canceled the booking more than a threshold amount of time from the time period, sending, for display to the guest user, an indication that the booking was canceled without an alternative accommodation having been reserved; and in response to determining that the host user canceled the booking within the threshold amount of time:

retrieving, from a listing database of the homestay application, a homestay listing associated with the booking, the homestay listing specifying a region of the accommodation;

retrieving, from an attribute database of the homestay application, attributes of the homestay listing;

mapping each attribute of the homestay listing to a set of similar attributes in an equivalence table;

retrieving, by the homestay application, a set of available hotel listings in the region during the time period;

determining attributes of each of the set of available hotel listings;

determining a set of comparable hotel listings from the set of available hotel listings each including a threshold number of similar attributes;

inputting, to a machine learning model, the homestay listing and a set of candidate hotel listings, wherein the machine learning model is trained by:

retrieving, from a database of the homestay application, historical homestay listings, each historical homestay listing associated with a set of attributes describing the historical homestay listings;

retrieving historical hotel listings, each historical hotel listing associated with a set of attributes describing the historical hotel listings;

determining sets of similar listings based on the attributes of the historical homestay listings and the historical hotel listings;

labelling each set of similar listings with a booking type; and training the machine learning model using the labelled set of similar listings;

selecting one of the set of comparable hotel listings based on output from the machine learning model;

sending a command, from the homestay application, to book the one of the set of comparable hotel listings for the guest user during the time period by populating a booking data structure with a connection between the guest user and the one of the set of comparable hotel listings; and sending, for display to the guest user, an indication that the canceled accommodation was replaced with an accommodation of the one of the set of comparable hotel listings.

10. The system of claim 9, wherein the operation of mapping each attribute of the homestay listing to a set of similar attributes in the equivalence table comprises:

generating a plurality of set of attributes by, for each attribute of the canceled accommodation:

mapping the attribute to a category in the equivalence table;

retrieving a set of attributes associated with the category; and determining similar attributes based on attributes that occur in a threshold number of the sets of attributes of the plurality of sets of attributes.

11. The system of claim 9, wherein the operations further comprise:

receiving, from the machine learning model, a percentage match between the homestay listing and each of the set of candidate hotel listings; and sending, for display to the guest user, one or more of the set of candidate hotel listings with a percentage match greater than a threshold value.

12. The system of claim 9, wherein the operations further comprise:

retrieving user profile data for the guest user;

determining a ranked set of prioritized attributes of the guest user based on the user data;

determining a subset of the set of comparable hotel listings each including one or more of a top percentage of the ranked prioritized attributes; and sending, from the homestay application, a command to book one of the subset for the guest user by populating a booking data structure with a connection between the guest user and the one of the subset.

13. The system of claim 9, wherein the operations further comprise:

ranking each of the set of comparable hotel listings based on similar attributes and availability for booking during the time period;

selecting a highest ranked comparable hotel listing;

sending a command, from the homestay application to a separate application, to book the highest ranked comparable hotel listing for the guest user during the time period; and sending, for display to the guest user, an indication that the canceled accommodation was replaced with an accommodation of the highest ranked comparable hotel listing.

14. A non-transitory computer-readable medium configured to store instructions, the instructions when executed by a processor cause the processor to:

receive, by a homestay application, an indication that a booking for an accommodation over a time period by the guest user has been canceled by a host user;

in response to determining that the host user canceled the booking more than a threshold amount of time from the time period, send, for display to the guest user, an indication that the booking was canceled without an alternative accommodation having been reserved; and in response to determining that the host user canceled the booking within the threshold amount of time:

retrieve, from a listing database of the homestay application, a homestay listing associated with the booking, the homestay listing specifying a region of the accommodation;

retrieve, from an attribute database of the homestay application, attributes of the homestay listing;

map each attribute of the homestay listing to a set of similar attributes in an equivalence table;

retrieve, by the homestay application, a set of available hotel listings in the region during the time period;

determine attributes of each of the set of available hotel listings;

determine a set of comparable hotel listings from the set of available hotel listings each including a threshold number of similar attributes;

input, to a machine learning model, the homestay listing and a set of candidate hotel listings, wherein the machine learning model is trained by:

retrieving, from a database of the homestay application, historical homestay listings, each historical homestay listing associated with a set of attributes describing the historical homestay listings;

retrieving historical hotel listings, each historical hotel listing associated with a set of attributes describing the historical hotel listings;

determining sets of similar listings based on the attributes of the historical homestay listings and the historical hotel listings;

labelling each set of similar listings with a booking type; and training the machine learning model using the labelled set of similar listings;

select one of the set of comparable hotel listings based on output from the machine learning model;

send a command, from the homestay application, to book the one of the set of comparable hotel listings for the guest user during the time period by populating a booking data structure with a connection between the guest user and the one of the set of comparable hotel listings; and send, for display to the guest user, an indication that the canceled accommodation was replaced with an accommodation of the one of the set of comparable hotel listings.

15. The non-transitory computer-readable medium of claim 14, wherein the instructions to map each attribute of the homestay listing to a set of similar attributes in the equivalence table comprise instructions to:

generate a plurality of set of attributes by, for each attribute of the canceled accommodation:

mapping the attribute to a category in the equivalence table;

retrieving a set of attributes associated with the category; and determine similar attributes based on attributes that occur in a threshold number of the sets of attributes of the plurality of sets of attributes.

16. The non-transitory computer-readable medium of claim 14, wherein the instructions further comprise instructions to:

receive, from the machine learning model, a percentage match between the homestay listing and each of the set of candidate hotel listings; and send, for display to the guest user, one or more of the set of candidate hotel listings with a percentage match greater than a threshold value.

17. The non-transitory computer-readable medium of claim 14, wherein the instructions further comprise instructions to:

retrieve user profile data for the guest user;

determine a ranked set of prioritized attributes of the guest user based on the user data;

determine a subset of the set of comparable hotel listings each including one or more of a top percentage of the ranked prioritized attributes; and send, from the homestay application, a command to book one of the subset for the guest user by populating a booking data structure with a connection between the guest user and the one of the subset.

18. The non-transitory computer-readable medium of claim 14, wherein the instructions further comprise instructions to:

rank each of the set of comparable hotel listings based on similar attributes and availability for booking during the time period;
select a highest ranked comparable hotel listing;
send a command, from the homestay application to a separate application, to book the highest ranked comparable hotel listing for the guest user during the time period; and
send, for display to the guest user, an indication that the canceled accommodation was replaced with an accommodation of the highest ranked comparable hotel listing.

\* \* \* \* \*